(12) United States Patent
Ostwald et al.

(10) Patent No.: US 10,596,738 B2
(45) Date of Patent: Mar. 24, 2020

(54) METHOD FOR PRODUCING A COMPONENT ASSEMBLY FOR A MOTOR VEHICLE, COMPONENT ASSEMBLY FOR A MOTOR VEHICLE, AND MOTOR VEHICLE HAVING THE COMPONENT ASSEMBLY

(71) Applicant: Volkswagen Aktiengesellschaft, Wolfsburg (DE)

(72) Inventors: Stefan Ostwald, Soehlde (DE); Olaf Heinemann, Wittingen (DE)

(73) Assignee: Volkswagen Aktiengesellschaft, Wolfsburg (DE)

( * ) Notice: Subject to any disclaimer, the term of this patent is extended or adjusted under 35 U.S.C. 154(b) by 0 days.

(21) Appl. No.: 16/259,495

(22) Filed: Jan. 28, 2019

(65) Prior Publication Data
US 2019/0168430 A1    Jun. 6, 2019

Related U.S. Application Data

(63) Continuation of application No. PCT/EP2017/065407, filed on Jun. 22, 2017.

(30) Foreign Application Priority Data

Jul. 28, 2016  (DE) .......................... 10 2016 213 963

(51) Int. Cl.
*B29C 45/17* (2006.01)
*B29C 45/14* (2006.01)
(Continued)

(52) U.S. Cl.
CPC ........ *B29C 45/174* (2013.01); *B29C 45/0001* (2013.01); *B29C 45/0025* (2013.01);
(Continued)

(58) Field of Classification Search
CPC .... B29C 45/14336; B29C 2045/14893; B29C 2035/1658; B29C 33/046;
(Continued)

(56) References Cited

U.S. PATENT DOCUMENTS 5,716,560 A * 2/1998 Heuchert ............ B29C 45/1704
264/37.17
6,432,350 B1 * 8/2002 Seres .................... B29C 45/174
264/500
(Continued)

FOREIGN PATENT DOCUMENTS

DE     19746827 A1    4/1999
DE     10160192 A1    6/2003
(Continued)

OTHER PUBLICATIONS

International Search Report dated Sep. 6, 2017 in corresponding application PCT/EP2017/065407.

*Primary Examiner* — Darlene P Condra
(74) *Attorney, Agent, or Firm* — Muncy, Geissler, Olds & Lowe, P.C.

(57) ABSTRACT

A method for producing a component assembly for a motor vehicle, wherein the component assembly has a base body for an instrument panel of the motor vehicle and at least one functional component, wherein the at least one functional component is injection-molded to the base body during the production of the component assembly and the component assembly is produced using a gas external pressure process. A component assembly for a motor vehicle is also provided, having a base body for an instrument panel of the motor vehicle and at least one functional component, wherein the base body is produced as an integral injection-molded part together with the at least one functional component using an (Continued)

external gas pressure process. Also, a motor vehicle having a component assembly is provided.

11 Claims, 2 Drawing Sheets

(51) Int. Cl.
| | | |
|---|---|---|
| *B29C 45/00* | (2006.01) | |
| *B29C 45/73* | (2006.01) | |
| *B29C 45/72* | (2006.01) | |
| *B60R 21/205* | (2011.01) | |
| B29L 31/30 | (2006.01) | |
| B29K 23/00 | (2006.01) | |
| B60R 21/16 | (2006.01) | |
| B29C 33/04 | (2006.01) | |
| B29L 12/00 | (2006.01) | |
| B29K 623/00 | (2006.01) | |
| B29C 35/16 | (2006.01) | |

(52) U.S. Cl.
CPC .... *B29C 45/14336* (2013.01); *B29C 45/7207* (2013.01); *B29C 45/7337* (2013.01); *B60R 21/205* (2013.01); *B29C 33/046* (2013.01); *B29C 2035/1658* (2013.01); *B29C 2045/14893* (2013.01); *B29K 2023/12* (2013.01); *B29K 2623/12* (2013.01); *B29K 2995/0022* (2013.01); *B29L 2012/00* (2013.01); *B29L 2031/3008* (2013.01); *B60R 2021/161* (2013.01)

(58) Field of Classification Search
CPC ......... B29L 2031/3008; B29L 2012/00; B60R 2021/161; B29K 2023/12; B29K 2995/0022; B29K 2623/12
See application file for complete search history.

(56) References Cited

U.S. PATENT DOCUMENTS

| | | | |
|---|---|---|---|
| 6,676,867 | B2 | 1/2004 | Tsuchiya et al. |
| 6,742,803 | B2 | 6/2004 | Ueno et al. |
| 6,827,369 | B2 | 12/2004 | Freisler et al. |
| 2008/0111281 | A1* | 5/2008 | Love ................. B29C 45/174 264/335 |
| 2016/0311391 | A1* | 10/2016 | Twork ............... B60R 21/2165 |
| 2017/0050607 | A1* | 2/2017 | Toda .................. B60R 21/2165 |
| 2017/0355120 | A1* | 12/2017 | Alexander ......... B29C 45/0081 |
| 2018/0222430 | A1* | 8/2018 | Totani ..................... B32B 5/08 |

FOREIGN PATENT DOCUMENTS

| | | |
|---|---|---|
| DE | 60106348 T2 | 3/2006 |
| DE | 102005038469 A1 | 2/2007 |
| DE | 102006058546 A1 | 5/2008 |
| DE | 102010031814 A1 | 5/2011 |
| EP | 0400135 A1 | 12/1990 |
| FR | 2873613 A1 | 2/2006 |

\* cited by examiner

METHOD FOR PRODUCING A COMPONENT ASSEMBLY FOR A MOTOR VEHICLE, COMPONENT ASSEMBLY FOR A MOTOR VEHICLE, AND MOTOR VEHICLE HAVING THE COMPONENT ASSEMBLY

This nonprovisional application is a continuation of International Application No. PCT/EP2017/065407, which was filed on Jun. 22, 2017, and which claims priority to German Patent Application No. 102016213963.0, which was filed in Germany on Jul. 28, 2016, and which are both herein incorporated by reference.

BACKGROUND OF THE INVENTION

Field of the Invention

The present invention relates to a method for producing a component assembly for a motor vehicle, wherein the component assembly has a base body for an instrument panel of the motor vehicle. The present invention further relates to a component assembly for a motor vehicle, and to a motor vehicle.

Description of the Background Art

In the prior art, it is known to assemble complex components for a motor vehicle from various individual components or component structures, and to then mount them. This leads to correspondingly high costs, since not only an increased amount of time is involved for joining the various component structures, but also the various component structures each have to be produced, transported and stored.

In a component assembly, which has a plurality of various component structures, also a plurality of different connecting elements is required, which are used to connect the respective component structures. This leads to the problem that an accordingly designed composite assembly has a relatively high weight. However, weight should be minimized in vehicle construction.

To reduce weight, it is possible to reduce the wall thickness of a component structure or a component assembly. However, this also leads to correspondingly reduced rigidity and/or reduced strength. In addition, the wall thickness can be reduced only to a certain extent with conventional production methods. In addition to a minimally necessary rigidity at specific points of the component structure, appropriate surface quality is also a requirement, for which reason the wall thickness of certain component structures cannot or may not be arbitrarily reduced.

From the German patent application DE 10 2010 031 814 A1 it is known to manufacture plastic parts, such as ornamental and trim parts in the automotive sector, for instrument panels, door panels and pillar panels by means of an external gas pressure process. The area of application of the external gas pressure process is limited to small component structures.

DE 10 2005 038 469 A1 describes a method for producing an injection-molded plastic component and a correspondingly manufactured plastic component. DE 601 06 348 T2v (which corresponds to U.S. Pat. No. 6,676,867) discloses an injection molding process. In DE 10 2006 058 546 A1, an airbag flap for a passenger seat and a method for producing the same is disclosed.

SUMMARY OF THE INVENTION

It is therefore an object of the present invention to at least partially respond to the problems described above. In particular, it is the object of the present invention to provide an improved method for producing a component assembly for a motor vehicle, an improved component assembly for a motor vehicle, and a motor vehicle with an accordingly improved component assembly.

According to an exemplary embodiment of the present invention, a method for producing a composite assembly for a motor vehicle is provided, wherein the composite assembly has a base body for an instrument panel of the motor vehicle and at least one functional component. In the method, the at least one functional component is injection-molded to the base body in or during the manufacture of the component assembly, wherein the component assembly is produced by means of an external gas pressure process.

By using an external gas pressure process during the molding of the at least one functional component to the base body, it is possible to reduce or even completely avoid sink marks in the area of the injection-molded functional component on the base body, and yet to produce a component assembly with a particularly complex and large-surface component structure. Sink marks can be prevented by the present method or at least reduced such that there is no optical disadvantage on the body or the structural component for an end user.

The at least one functional component can be a base body-unspecific functional component, which is generally not a fundamental component of the base body of the instrument panel and could also be arranged separately from the base body in the motor vehicle. The base body is basically understood to be an instrument panel basic structure that is designed or can be arranged to form or co-form an instrument panel area of the motor vehicle and to accommodate control elements for the vehicle occupant of the motor vehicle. By way of example, the functional component is not understood to be a mere passage opening in the base body, which can accommodate a display or control element for a vehicle occupant. Rather, the at least one functional component is understood to be a functional component which cooperates with another functional component in the motor vehicle for considerable mechanical interaction, or can at least be designed for this purpose. The functional component may, for example, have a volume or "span" greater than 0.1 dm$^3$, for example between 0.1 dm$^3$ and 100 dm$^3$, preferably between 0.5 dm$^3$ and 50 dm$^3$.

The external gas pressure need not be applied to the entire surface of the component assembly during manufacture or during injection molding of the component assembly. Rather, in the production of the component assembly, the external gas pressure is selectively applied to at least one region in which the at least one functional component is molded to the base body during the production of the component assembly. As a result, potential later sink marks on the component assembly can be systematically counteracted.

In the present case, a component assembly can be understood to be a composite of fundamentally two different and/or separate components, which are connected to one another for the purpose of saving space as well as for a targeted positive interaction through the component assembly. The production of the component assembly is not restricted to the at least one functional component being molded to the base body only after completion of said body. Rather, in the present case, it is preferable for the at least one functional component to be integrated or molded to the base body immediately during the production of the component.

In the present case, the motor vehicle is not limited to a road vehicle or a passenger car. Thus, the method according to the invention can also be made available for producing a component assembly for a truck, a watercraft, a rail vehicle, an aircraft and/or a robot.

It is possible that the at least one functional component can have an airbag deployment channel or is designed as such. That is, during manufacturing of the component assembly, the airbag deployment channel is molded to the base body for the instrument panel using an external gas pressure process. Since up to now, the negative impact on the surface of the base body during molding of the airbag deployment channel had been enormous, i.e., sink marks and stresses on the body, which could even adversely affect a respective component, molding the airbag deployment channel to a base body for a high-gloss instrument panel was avoided. Therefore, for a high-gloss instrument panel, it has been customary to weld an air bag deployment channel to a base body as an additional part, and to then laminate the surface of the instrument panel, for example with a so-called slush skin. However, this is time consuming and correspondingly expensive. In the context of the present invention, it has now been found that the external gas pressure process can also be applied to large-area structural components such as the base body for an instrument panel and, moreover, the airbag deployment channel can be sprayed particularly advantageously to the base body when using this method. The resulting component assembly can be made correspondingly fast and inexpensively. In addition, when molding the airbag deployment channel to the base body using the external gas pressure process, very little or no additional material is used, whereby the component assembly can be provided in a weight saving manner. The present airbag deployment channel is used to guide the inflatable member of the airbag, in particular a passenger airbag, during deployment of the same.

It is advantageous if the at least one functional component, in particular the airbag deployment channel, is injection-molded to a rear side of the base body which faces away from a visible side of the base body. The use of the external gas pressure process effectively counteracts surface damage or sink marks as well as stresses on the visible side of the body, which may otherwise occur during injection molding of the functional component to the back of the body, so that the visible side of the base body of the instrument panel remains at least substantially unaffected. The visible side of the base body of the instrument panel is understood to be that side of the base body of the instrument panel which at least substantially faces the passenger compartment of the vehicle when the instrument panel in the vehicle is in the installed state.

Further, it is possible within the scope of the present invention that during manufacture of the composite assembly, external gas pressure is applied to a planar region of the base body around the at least one functional component, wherein the planar region of the base body is preferably arranged on a rear side of the main body facing away from a visible side of the base body for the reasons described above. As a result, a large proportion of volumetric shrinkage during a solidification process can be compensated and excluded or at least greatly reduced as the cause of sink marks on the surface of the base body. A planar region is to be understood as meaning a range of, for example, more than 50 $cm^2$, in particular between 50 $cm^2$ and 1000 $cm^2$, preferably between 100 $cm^2$ and 500 $cm^2$, in which no protrusion or the like is configured, or which extends homogeneously or essentially homogeneously and is preferably flat.

Moreover, according to the present invention, it may be advantageous if in the manufacture of the component the at least one functional component is cooled at least in sections with CO2 spot cooling, which is applied in particular by a molding tool for producing the component assembly. In this case, CO2 cooling or CO2 spot cooling is introduced into a tool-side contour of the molding tool, which is designed to be complementary to an associated section of the component assembly or the base body and/or the functional component, in order to avoid increased heating of contour areas in the molding tool. This way, hot spots are avoided in the product, which contribute to the aforementioned sink marks.

It can be of further advantage in a method according to the invention if, in the manufacture of the component at least one recessed portion of the at least one functional component is specifically cooled with CO2 spot cooling, which is applied in particular by a molding tool for the manufacture of the component. The at least one recessed portion is preferably cooled by a complementarily formed projection section of the molding tool, wherein CO2 spot cooling is introduced at least partially into the associated or complementary recessed portion by the at least one projection section. Due to the selective CO2 spot cooling of the functional component also in the at least one recessed portion, i.e., in an inner region of the functional component, it is possible to reduce or even prevent possible sink marks in a particularly reliable manner. The at least one recessed portion may be configured, for example, as at least one recessed portion or as a plurality of recessed portions of a reinforcing structure of an airbag deployment channel. The at least one recessed portion of the functional component is preferably designed as at least one pocket portion of the functional component.

Moreover, according to the present invention, it is possible that the component assembly is manufactured by means of the external gas pressure process as well as by using polypropylene (PP). In particular, the base body is produced using polypropylene. By using polypropylene, the component assembly or the base body can be provided with particularly advantageous material properties and corresponding surface properties. The component assembly is prepared such that after its production it has mainly of polypropylene or substantially, completely or at least substantially completely is formed of polypropylene. By using the polypropylene, the component assembly or at least one surface of the base body, which during use in a motor vehicle is arranged in the direction of the vehicle cabin, can be produced high-gloss or grained in conjunction with the external gas pressure process. A high-gloss or grained production is a production of the component assembly which is understood to have an at least partially defined surface finish or surface structure after injection molding. That is, if the component assembly was made, for example, high-gloss, a surface of the component assembly has a defined surface finish after injection molding. The desired surface finish can be achieved in particular by the external gas pressure process during injection molding. Due to the external gas pressure process used, combined with the polypropylene, the component assembly has no or no significant visible sink marks and a corresponding high-gloss surface. That is, right after injection molding, the surface of the component assembly or the base body is already "glossy" or grained as desired.

In accordance with another aspect of the present invention, a component assembly can be provided for a motor vehicle, wherein the component assembly is made according to a method as described in detail above. Thus, the component assembly according to the invention has the same advantages as those that have been described in detail with reference to the method according to the invention.

In the context of the present invention, a component assembly is further provided for a motor vehicle, wherein the component assembly comprises a base body for an instrument panel and at least one functional component, and the base body is made using an external gas pressure process together with the at least one functional component as an integral plastic injection-molded part. Due to the integral production or the correspondingly integral structure of the component assembly, this can be provided particularly lightweight and nevertheless stable. In the present case, an integral injection-molded part is to be understood as an integral or monolithic injection-molded component.

According to the present invention, the at least one functional component can be provided as an airbag deployment channel, in particular as a passenger airbag deployment channel. Accordingly, the base body and the airbag deployment channel are provided as a one-piece or monolithic injection-molded component or as a corresponding component assembly requiring no weld or any other, additional integrally bonded, form-fitting and/or force-fitting connecting element.

Also, a motor vehicle having a component assembly as described above is provided. Hence, the motor vehicle according to the invention has the same advantages as have been described in detail with reference to the inventive method.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
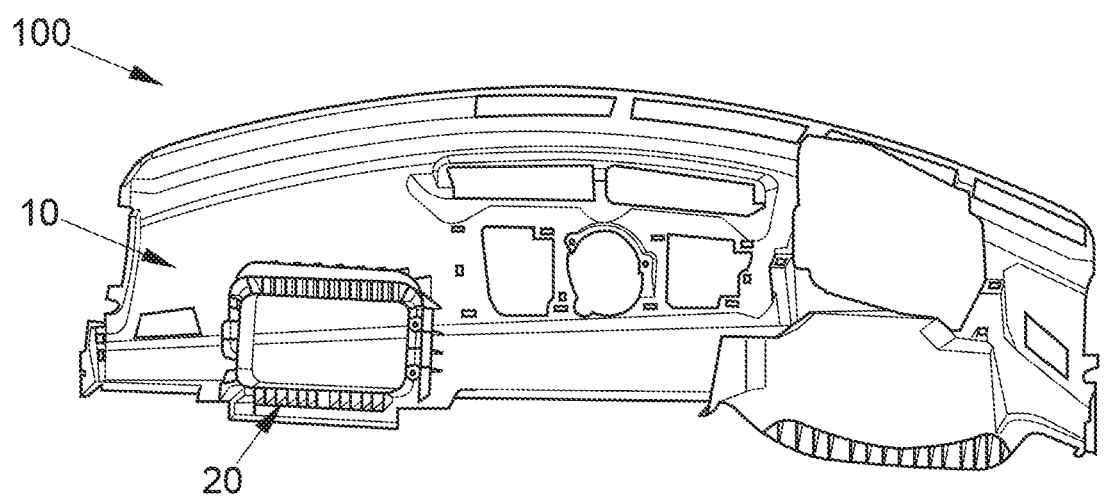
FIG. 1 shows a component assembly according to an exemplary embodiment of the present invention.

FIG. 1 shows a component assembly 100 for a motor vehicle 1 according to a preferred embodiment of the present invention. The component assembly 100 according to FIG. 1 essentially has a polypropylene base body 10 for an instrument panel of the motor vehicle 1 and a functional component 20, wherein the functional component 20 is designed as an airbag deployment channel on a back side of the base body 10, which constitutes a rear side of the base body 10 facing away from a visible side of the base body 10. The back side or rear side of the main body 10 represents a side of the base body 10 for the instrument panel which points or substantially points in the direction of a front side of the motor vehicle 1 when the component assembly 100 is installed in the motor vehicle 1, and thus, in the installed state of the component assembly 100, facing away from the passenger compartment of the motor vehicle 1. Accordingly, a front side of the base body 10 for the instrument panel refers to a visible side which points or substantially points in the direction of a passenger compartment of the motor vehicle 1 when the component assembly 100 is installed in the motor vehicle 1.

According to FIG. 1, the base body 10 is produced together with the functional component 20, designed as an airbag deployment channel, as an integral or plastic injection-molded part using an external gas pressure process. The airbag deployment channel 20 of plastic is designed as an airbag deployment channel for a passenger airbag or as a passenger airbag deployment channel and disposed at a correspondingly appropriate position on the base body 10 for the instrument panel, namely on the back side or rear side of the base body 10.

Figure 2:
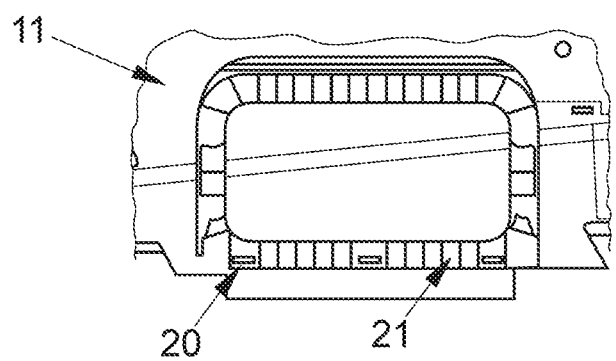
FIG. 2 shows a section of a component assembly according to the embodiment of the present invention shown in FIG. 1.

FIG. 2 shows an enlarged representation of the arrangement of the functional component 20 on the base body 10 embodied as an airbag deployment channel. FIG. 2 shows a planar region 11 of the base body 10, which is configured around the airbag deployment channel 20 and above which gas external pressure is applied during the manufacture of the component assembly 100. The planar region 11 is arranged on the back side or rear side of the base body 10. FIG. 2 also shows several recesses 21 in a reinforcing structure of the airbag deployment channel 20.

Figure 3:
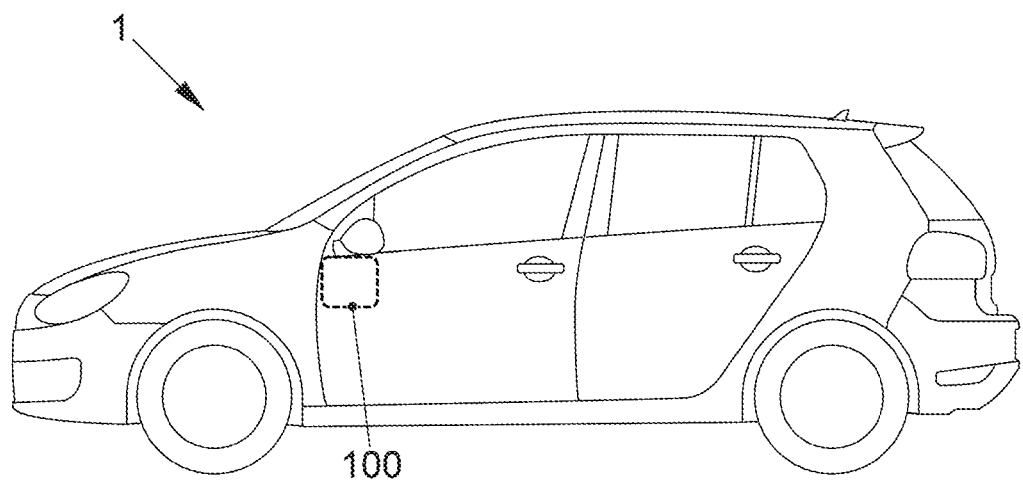
FIG. 3 shows a motor vehicle with the component assembly shown in FIG. 1.

FIG. 3 shows a rough schematic of a motor vehicle 1 with a component assembly 100 according to FIG. 1, wherein the component assembly 100 is arranged in an instrument panel area of the motor vehicle 1 or as part of an instrument panel of the motor vehicle 1.

Figure 4:
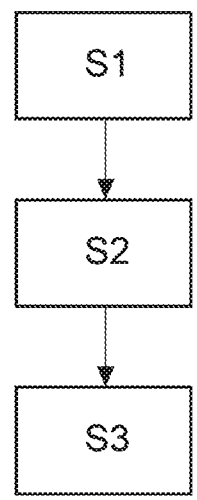
FIG. 4 is a flowchart explaining the method according to the invention for manufacturing a component assembly.

Subsequently, a method is described with reference to FIG. 4 for the manufacture of an inventive component assembly 100 for an instrument panel or a motor vehicle 1 comprising said instrument panel.

To manufacture the component assembly 100, in a first step S1, a plastic base body 10 for an instrument panel and a plastic functional component 20 in the form of an airbag deployment channel are provided. The plastic material preferably used is polypropylene or a filled polypropylene or a fiber-reinforced polypropylene or a polypropylene derivative.

In a second, subsequent or at least partially concurrent step S2, the functional component 20 is molded to the base body 10 in the manufacture of the component assembly 100, wherein the component assembly 100 is manufactured using an external gas pressure process. In this case, external gas pressure is applied to a planar region 11 of the base body 10 around the at least one functional component 20, wherein the planar region 11 is arranged on the rear side of the base body 10 facing away from the visible side of the base body 10.

In a third step, which is carried out during the production of the component assembly 100, the functional component 20 is cooled in sections with $CO_2$ spot cooling, which is applied by a molding tool for creating the component assembly 100. More specifically, during this step, several pockets or recessed portions 21 of a reinforcing structure of the functional component 20 are selectively cooled with $CO_2$ spot cooling, which is applied by the molding tool for creating the component assembly 100.

In addition to the described embodiments, the present invention permits further embodiments. Thus, the functional component is for example not limited to the illustrated airbag deployment channel, but can also comprise or embody another functional component, in particular a correspondingly large-sized functional component.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method for manufacturing a component assembly for a motor vehicle, wherein the component assembly comprises a base body for an instrument panel of the motor vehicle and at least one functional component, the method comprising:
    molding the at least one functional component to the base body during the manufacture of the component assembly; and
    producing the component assembly using a gas external pressure process,
    wherein external gas pressure is applied to a planar region of the base body around the at least one functional component during manufacture of the component assembly, and
    wherein the planar region of the base body is arranged on a rear side of the base body facing away from a visible side of the base body.

2. The method according to claim 1, wherein the at least one functional component is injection-molded onto the rear side of the base body facing away from the visible side of the base body.

3. The method according to claim 1, wherein the at least one functional component comprises or is designed as an airbag deployment channel.

4. The method according to claim 1, wherein in the production of the component assembly, at least one recessed portion of the at least one functional component is cooled with CO2 spot cooling, which is applied by a molding tool for manufacturing the component assembly.

5. The method according to claim 1, wherein the component assembly is produced using the external gas pressure process and using polypropylene.

6. A component assembly for a motor vehicle, wherein the component assembly is produced according to the method according to claim 1.

7. The component assembly according to claim 6, wherein the at least one functional component is molded to the rear side of the base body facing away from the visible side of the base body.

8. The component assembly according to claim 6, wherein the at least one functional component is an airbag deployment channel.

9. A motor vehicle comprising a component assembly according to claim 6.

10. A method for manufacturing a component assembly for a motor vehicle, wherein the component assembly comprises a base body for an instrument panel of the motor vehicle and at least one functional component, the method comprising:
    molding the at least one functional component to the base body during the manufacture of the component assembly; and
    producing the component assembly using a gas external pressure process,
    wherein in the production of the component assembly, the at least one functional component is at least sectionally cooled with CO2 spot cooling, which is applied by a molding tool for manufacturing the component assembly.

11. A component assembly for a motor vehicle, the component assembly comprising:
    a base body for an instrument panel of the motor vehicle, the base body having a planar region that is arranged on a rear side of the base body facing away from a visible side of the base body; and
    at least one functional component,
    wherein the base body is produced as an integral injection-molded part together with the at least one functional component using an external gas pressure process, the at least one functional component molded to the planar region of the base body with external gas pressure applied to the planar region of the base body around the at least one functional component.

* * * * *